United States Patent
Garner

(10) Patent No.: US 11,240,555 B2
(45) Date of Patent: Feb. 1, 2022

(54) PROVIDING OVER-THE-AIR CONTENT TO ANY DEVICE

(71) Applicant: Roku, Inc., Los Gatos, CA (US)

(72) Inventor: Gregory Mack Garner, Springdale, AR (US)

(73) Assignee: Roku, Inc., San Jose, CA (US)

(*) Notice: Subject to any disclaimer, the term of this patent is extended or adjusted under 35 U.S.C. 154(b) by 0 days.

(21) Appl. No.: 16/430,982

(22) Filed: Jun. 4, 2019

(65) Prior Publication Data
US 2020/0186861 A1 Jun. 11, 2020

Related U.S. Application Data

(60) Provisional application No. 62/775,453, filed on Dec. 5, 2018.

(51) Int. Cl.
H04N 21/437 (2011.01)
H04N 21/222 (2011.01)
(Continued)

(52) U.S. Cl.
CPC ....... *H04N 21/437* (2013.01); *H04N 21/2223* (2013.01); *H04N 21/2387* (2013.01);
(Continued)

(58) Field of Classification Search
CPC ............. H04N 21/437; H04N 21/6112; H04N 21/2387; H04N 21/4126; H04N 21/812;
(Continued)

(56) References Cited

U.S. PATENT DOCUMENTS 5,784,683 A * 7/1998 Sistanizadeh ....... H04L 65/4076
348/E7.051
9,405,710 B2 * 8/2016 Lau ......................... H04N 21/47
(Continued)

FOREIGN PATENT DOCUMENTS

| KR | 101463823 B1 | 11/2014 |
| KR | 1020150039627 A | 4/2015 |

(Continued)

OTHER PUBLICATIONS

U.S. Appl. No. 16/430,990 to Garner et al., "Downloadable AVOD Content", filed Jun. 4, 2019.
(Continued)

*Primary Examiner* — Chenea Davis
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for providing over-the-air (OTA) content to electronic devices. Some embodiments operate by automatically providing program listings of OTA content to the electronic devices, wherein the program listings are displayed in user interfaces of the electronic devices; receiving a user selection of particular OTA content from one of the electronic devices; receiving electronic signals containing OTA content from an antenna; processing, using a tuner, the received electronic signals to extract the particular OTA content therefrom; and transmitting the extracted OTA content to the electronic device for playback. In some embodiments, the extracted OTA content is stored in storage of said the electronic device for future on-demand playback to the user.

27 Claims, 5 Drawing Sheets

(51) Int. Cl.
  *H04N 21/81*      (2011.01)
  *H04N 21/433*     (2011.01)
  *H04N 21/472*     (2011.01)
  *H04N 21/2387*    (2011.01)
(52) U.S. Cl.
  CPC ..... *H04N 21/433* (2013.01); *H04N 21/47202* (2013.01); *H04N 21/812* (2013.01)
(58) Field of Classification Search
  CPC ............. H04N 21/6125; H04N 21/433; H04N 21/4622; H04N 21/47202; H04N 21/2223; H04N 21/482
  See application file for complete search history.

(56) References Cited

U.S. PATENT DOCUMENTS

| | | | | |
|---|---|---|---|---|
| 2006/0159109 | A1* | 7/2006 | Lamkin | G11B 27/34 370/401 |
| 2007/0130003 | A1* | 6/2007 | Davis | G06Q 30/02 705/14.49 |
| 2010/0251292 | A1  | 9/2010 | Srinivasan et al. | |
| 2012/0278837 | A1* | 11/2012 | Curtis | H04N 21/8126 725/42 |
| 2014/0059614 | A1* | 2/2014 | Shoykher | G06F 3/04883 725/46 |

FOREIGN PATENT DOCUMENTS

| | | |
|---|---|---|
| KR | 101539634 B1 | 7/2015 |
| KR | 101891811 B1 | 8/2018 |

OTHER PUBLICATIONS

International Search Report and Written Opinion of the International Searching Authority directed to related International Patent Application No. PCT/US2019/064442, dated Mar. 26, 2020; 10 pages.

* cited by examiner

PROVIDING OVER-THE-AIR CONTENT TO ANY DEVICE

CROSS-REFERENCE TO RELATED APPLICATIONS

This application claims priority to U.S. Provisional Appl. No. 62/775,453 titled "PROVIDING OVER-THE-AIR CONTENT TO ANY DEVICE," filed Dec. 5, 2018, 2018, which is herein incorporated by reference in its entirety.

BACKGROUND

This disclosure is generally directed to providing over-the-air (OTA) content to any electronic device.

BACKGROUND

Even with the advent of cable and satellite TV, streaming media, DVDs, Blu-Rays, etc., over-the-air (OTA) content may still be valuable to many users. For example, by accessing OTA content, users may be able to access local TV stations, sporting events and other programming that might not otherwise be available except through pay to watch services.

But the ways to watch OTA content are limited. A conventional approach is to connect an antenna to a TV. In today's highly mobile world, however, being tied to a TV to watch OTA content is often not a satisfying or even viable approach.

Some rudimentary approaches for watching OTA content on mobile devices (such as smartphones) have been attempted. For example, a user can attempt to record OTA content on a digital video recorder (DVR) or other set top box (STB), and then try to access that DVR to pull content to his smartphone. But these approaches are time consuming and not user friendly, and do not provide users with easy access to the wealth of content (both OTA and non-OTA) that is available today.

SUMMARY

Provided herein are system, apparatus, article of manufacture, method and/or computer program product embodiments; and/or combinations and sub-combinations thereof, for providing over-the-air (OTA) content to electronic devices.

Some embodiments operate by automatically providing program listings of OTA content to the electronic devices; wherein the program listings are displayed in user interfaces of the electronic devices; receiving a user selection of particular OTA content from one of the electronic devices; receiving electronic signals containing OTA content from an antenna; processing, using a tuner, the received electronic signals to extract the particular OTA content therefrom; and transmitting the extracted OTA content to the electronic device for playback. In some embodiments, the extracted OTA content is stored in storage of said the electronic device for future on-demand playback to the user.

Some embodiments further operate by automatically providing program listings of non-OTA content to the electronic devices, wherein the OTA program listings and the non-OTA program listings are displayed in the user interfaces of the electronic devices; receiving a user selection of particular non-OTA content from one of the electronic devices; downloading the particular non-OTA content from a content source accessible via the Internet; and transmitting the downloaded non-OTA content to the electronic device, for playback on the screen of the electronic device.

This disclosure is also directed to an electronic device that receives over-the-air (OTA) content. The electronic device may be a computer, smart phone, tablet, wearable, appliance; or internet-of-things (IoT) device, to name just some examples. In some embodiments, the electronic device is configured to: receive program listings of OTA content; display the program listings in a user interface on the screen; receive a user selection of particular OTA content through user navigation of the user interface; provide the user selection to a media device, wherein the media device, using a tuner, processes electronic signals received by an antenna to extract the particular OTA content therefrom; receive the extracted OTA content from the media device via the Internet; and play the received OTA content on the screen.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof for providing over-the-air (OTA) content to any electronic device. In some embodiments, listings of both OTA content and non-OTA content (such as but not limited to on-demand streaming content) may be automatically provided to any electronic device that has installed therein an appropriate software application (app). Users of the electronic devices may browse the listings and select OTA content and/or non-OTA content for playback on the electronic devices. Non-OTA content may be provided to the electronic devices from content sources via the Internet. OTA content may be provided from media devices that receive over-the-air wireless signals (such as radio frequency and/or intermediate frequency signals) from connected antennas, and extract OTA content from such received wireless signals for distribution to the electronic devices over the Internet.

Figure 1:
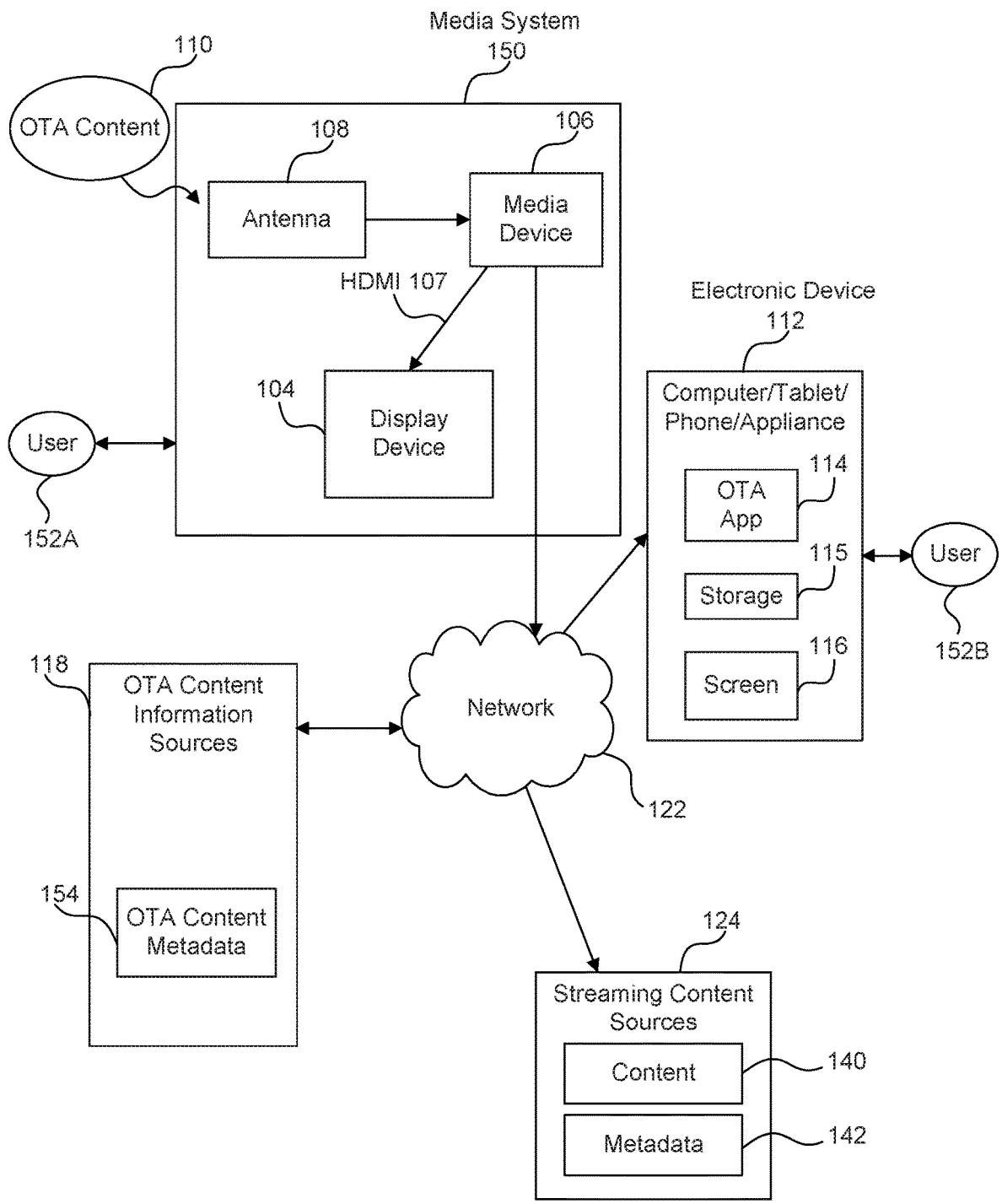
FIG. 1 illustrates a block diagram of a multimedia environment where over-the-air content is made available to a plurality of electronic devices, according to some embodiments.

FIG. 1 illustrates a block diagram of a multimedia environment 102, according to some embodiments. In a non-limiting example, multimedia environment 102 is directed to playing content such as movies, TV shows, games, audio books, and music, to name just some examples. For example, the content may be over-the-air (OTA) content 110 which is content that is embedded (that is, modulated and upconverted) into electronic signals (such as radio frequency, RF, signals) and then wirelessly broadcasted over the air. Also, the content may be non-OTA content, such as content from satellite, cable, DVD, Blu-Ray, Internet streaming, etc., to name just some examples.

In some embodiments, the OTA content and/or non-OTA content may be advertising-based video on demand (AVOD) content. Example embodiments for the generation and operation of AVOD content are described in U.S. patent application Ser. No. 16/430,990, titled "Downloadable AVOD Content," filed herewith, which is herein incorporated by reference in its entirety, and these embodiments may be combined with any of the embodiments described herein.

The multimedia environment 102 may include a plurality of media systems 150. Each media system 150 may be used by one or more users 152A. The media system 150 could be user 152A's home entertainment system, for example.

Each media system 150 may include one or more media devices 106 each coupled to one or more display devices 104. Media device 106 may be any combination of a streaming media device, over-the-air (OTA) content tuner, DVD/Blu-Ray device, audio/video playback device, cable box, satellite box, and/or digital video recording (DVR) device, to name just a few examples. Display device 104 may be a monitor, television, computer, smart phone, tablet, wearable (such as a watch), appliance, internet-of-things (IoT) device, and/or projector, to name just a few examples. In some embodiments, media device 106 can be a part of, integrated with, operatively coupled to, and/or connected to its respective display device 104.

Media device 106 may be coupled to or integrated with an antenna 108. The antenna 108, in a well known manner, may be configured to receive radio frequency (RF) signals containing OTA content 110.

The media device 106 may be configured to communicate with network 122. In various embodiments, the network 122 can include, without limitation, wired and/or wireless intranet, extranet, Internet, cellular, Bluetooth and/or any other short range, long range, local, regional, global communications network, as well as any combination thereof.

The multimedia environment 102 may include a plurality of streaming content servers 124 (also called streaming content providers and sources 124). Each content server 124 may be configured to communicate with network 122.

Each content server 124 may store content 140 and metadata 142. Content 140 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 142 comprises data about content 140. For example, metadata 142 may include a programming schedule of the content 140, that lists content 140 that is available to be streamed to users 152. The metadata 142 may also include associated or ancillary information indicating or related to writer, director, producer, composer, artist, actor, summary, chapters, production, history, year, trailers, alternate versions, related content, applications, and/or any other information pertaining or relating to the content 140. Metadata 142 may also or alternatively include links to any such information pertaining or relating to the content 140. Metadata 142 may also or alternatively include one or more indexes of content 140, such as but not limited to a trick mode index.

The multimedia environment 102 may also include any number of OTA content information sources 118. Each OTA content information source 118 may be configured to communicate with network 122, and may store OTA content metadata 154. The OTA content metadata 154 may include metadata pertaining or relating to the OTA content 110. For example, metadata 154 may include a programming schedule of the OTA content 110, that lists the OTA content 110 that is scheduled to be played both currently and in the future. The OTA content metadata 154 may also include associated or ancillary information indicating or related to writer, director, producer, composer, artist, actor, summary, chapters, production, history, year, trailers, alternate versions, related content, applications, and/or any other information pertaining or relating to the OTA content 110. The OTA content metadata 154 may also or alternatively include links to any such information pertaining or relating to the OTA content 110.

The multimedia environment 102 may also include any number of electronic devices 112. Each electronic device 112 may be a computer, smart phone, tablet, wearable (such as a watch), appliance, internet-of-things (IoT) device, etc., to name just a few examples.

The electronic devices 112 may be used by user(s) 152B. In some embodiments, users 152B may be the same as, related to or associated with users 152A. For example, users 152A, 152B may be in the same family, may be friends, or may be work colleagues, to name just some examples.

Each electronic device 112 may include storage 115 and screen 116.

Also, at least some of the electronic devices 112 may have installed therein an OTA app 114. The OTA app 114 operates in a user friendly manner to automatically make available to the electronic device 112 both OTA content 110 and non-OTA content. Users 152B of electronic devices 112 are thus able to access OTA content 110 without having the burden of, for example, configuring a DVR device to record OTA content 110, or having to manually navigate to the DVR device (or other set top box) over the Internet to access OTA content 110. Instead, according embodiments of this disclosure, listings of OTA content 110 are automatically provided to electronic devices 112. Listings of non-OTA content are also provided to electronic devices 112. In this manner, users 152B are able to easily view, navigate, select and download content (both OTA and non-OTA content) for viewing on their respective electronic devices 112.

Figure 2:
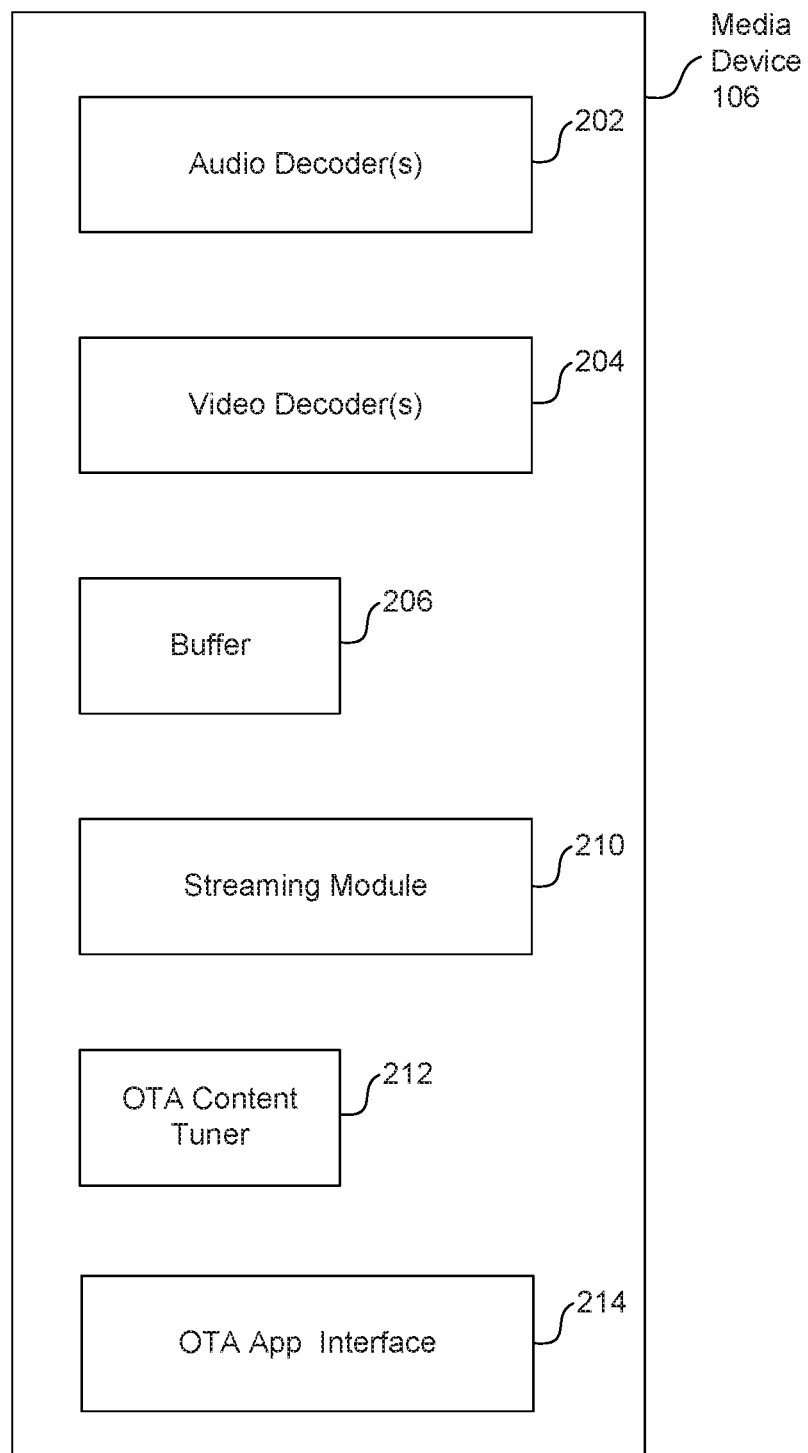
FIG. 2 illustrates a block diagram of a media device of FIG. 1, according to some embodiments.

FIG. 2 illustrates a block diagram of an example media device 106, according to some embodiments. Media device 106 may include one or more audio decoders 202 and one or more video decoders 204.

Each audio decoder 202 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 204 may be configured to decode video of one or more video formats, such as but not limited to MP4 (mp4, m4a, m4v, f4v, f4a, mob, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAY, LXF, GXF, and/or VOB, to name just some examples. Each video decoder 214 may include one or more video codecs, such as but not limited to H.263, H.264, HEY, MPEG1, MPEG2, MPEG-TS, MPEG-4, Theora, 3GP, DY, DVCPRO, DVCPRO, DVCProHD, IMX, XDCAM HD, XDCAM HD422, and/or XDCAM EX, to name just some examples.

The media device 106 may also include a buffer 206 and streaming module 210. In a streaming embodiment, the streaming module 210 may operate to obtain streaming content 140 (that was requested by user 152) from a streaming content source 124 via the network 122. The media device 106 may transmit the received streaming content 140 to its associated display device 104 and/or to an electronic device 112 for presentation to the user 152 who requested the content.

In some embodiments, the received streaming content 140 may be buffered in the buffer 206 for some time period before being provided to the display device 104/electronic device 112 for playback. Such buffering may be performed, for example, to synchronize audio and video playback, or to support processing by the audio decoders 202 and/or video decoders 204. In some embodiments, such buffering is typically not performed to enable later on-demand viewing of the received streaming content 140 by the user 152. Instead, if the user 152 wishes to watch the content 140 at a later time, the media device 106 will operate to re-stream the content 140 from the streaming content source 124.

The media device 106 may also include an OTA content tuner 212 and an OTA app interface 214. In some embodiments, the OTA content tuner 212 operates to receive RF or intermediate frequency signals (or other wireless signals) containing OTA content 110 from the antenna 108, and to decode and extract the OTA content 110 from the received signals in a well known manner. The OTA app interface 214 operates with OTA apps 114 in electronic devices 112 to make OTA content 110 available to the electronic devices 112. Such operation shall now be described with respect to FIG. 4.

Figure 3:
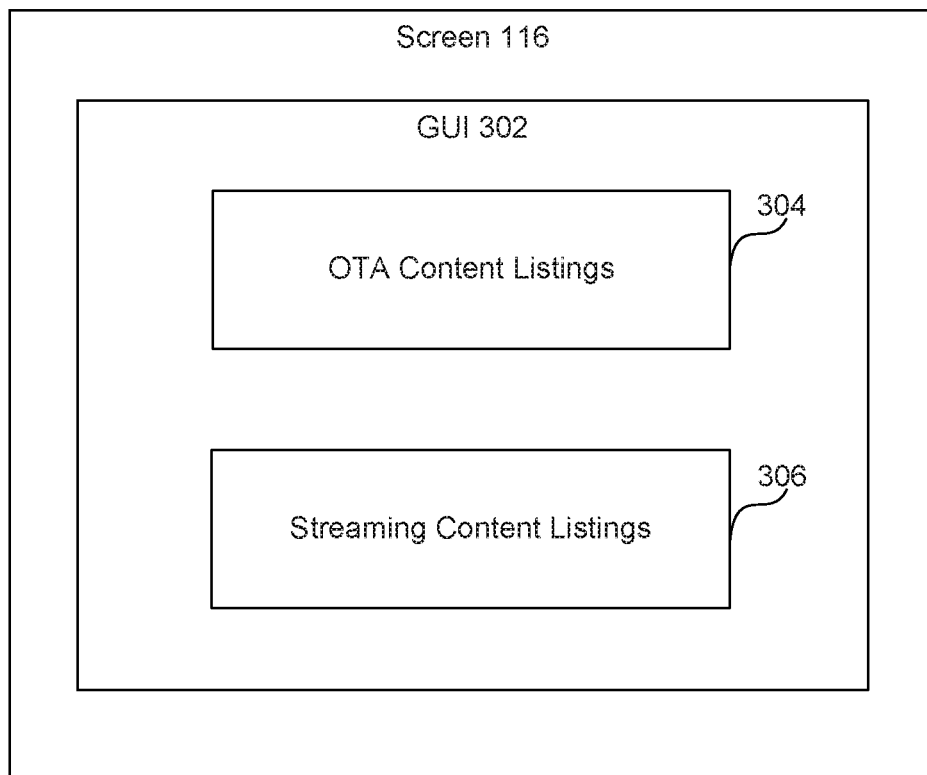
FIG. 3 illustrates an example graphical user interface displayed on an electronic device of FIG. 1, according to some embodiments.
Figure 4:
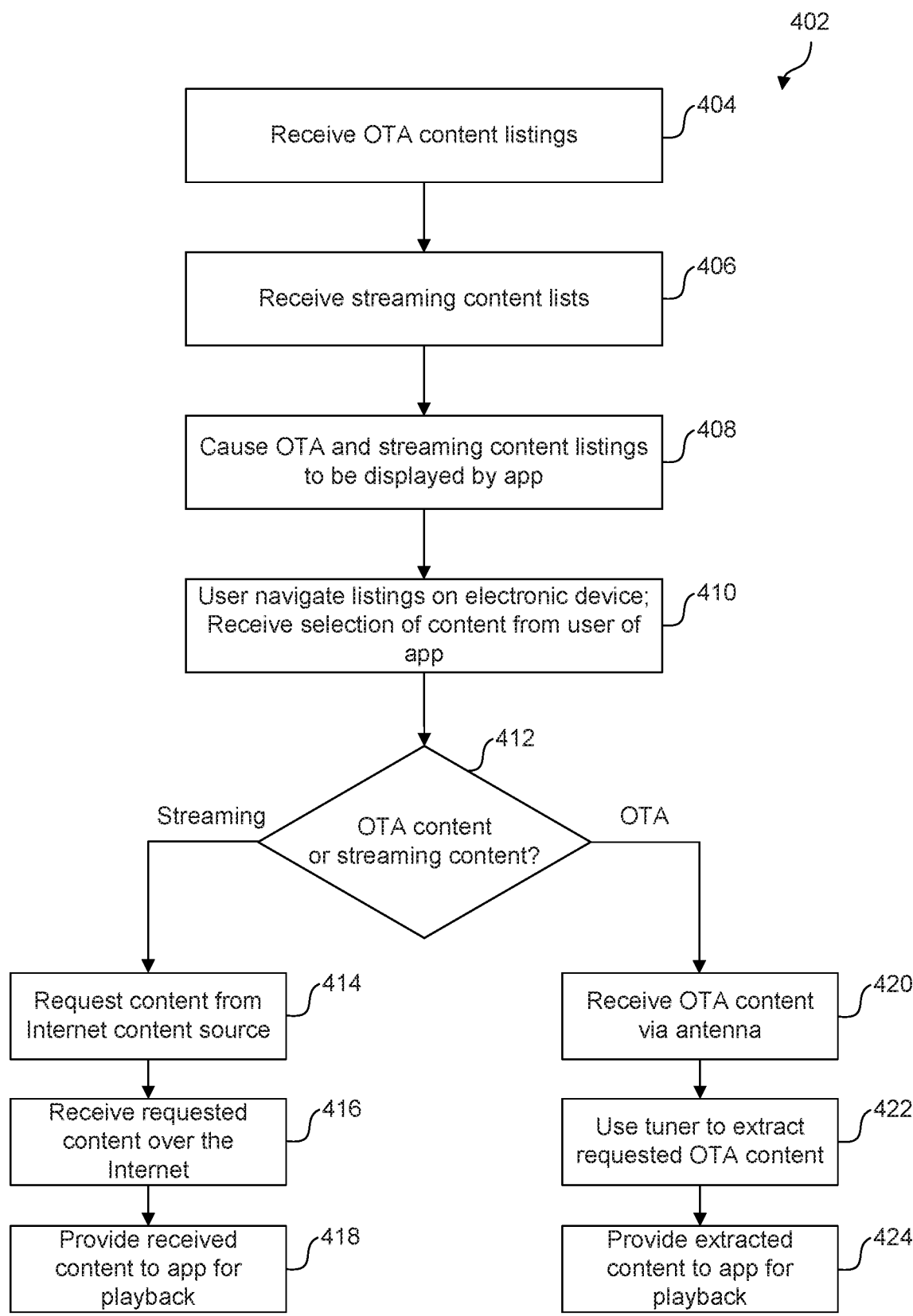
FIG. 4 illustrates a flowchart for providing over-the-air content to any electronic device, according to some embodiments.

FIG. 4 is a flowchart of a method 402 for providing OTA content 110 to any number of electronic devices 112, according to some embodiments. Method 402 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 402 shall be described with reference to FIGS. 1-3. However, method 402 is not limited to those example embodiments.

In 404, the media device 106 may access the OTA content information sources 118 via the network 122, to request and receive OTA content metadata 154 pertaining to the OTA content 110. The received OTA content metadata. 154 may include, among other things, current and future program listings of the OTA content 110 (sometimes called herein OTA content listings).

In 406, the media device 106 may access the streaming content sources 118 via the network 122, to request and receive metadata 142 pertaining to the content 140. The metadata 142 may include, among other things, a programming schedule of the content 140, that lists the content 140 that is available to be streamed for display to users 152 (sometimes called herein streaming content listings).

In 408, the OTA app interface 214 in the media device 106 may interact with the OTA apps 114 in the electronic devices 112 to cause the OTA content listings and the streaming content listings to be displayed in the screens 116 of the electronic devices 112 for viewing and navigation by users 152B. FIG. 3 illustrates an example graphical user interface (GUI) 302 that may be displayed in the screen 116 as a result of the operation of 408. The GUI 302 may include an area 304 wherein the OTA content listings are displayed, and an area 306 where streaming content listings are displayed.

In 410, the user 152B at one of the electronic devices 112 may navigate the GUI 302 and select some content for playback on the electronic device 112. The content may be, for example, a movie, TV show, music, computer game, audible book, etc., to name just some examples. Then in 410, the electronic device 112 transmits this selection by the user 152B to the OTA app interface 214 of the media device 106. The electronic device 112 includes in this transmission an indication of whether the selected content is OTA content 110 (selected from area 304 in the GUI 302) or streaming content 140 (selected from area 306).

As indicated by 412, if the content is streaming content 140, then 414 is performed. Otherwise, if the content is OTA content 110, then 420 is performed.

In 414, if the content is streaming content 140, then the streaming module 210 of the media device 106 may access the appropriate streaming content source 124 to request and download the requested content 140 via the network 122.

In 416, the streaming module 210 may receive the requested content 140 from the streaming content source 124 via the network 122. The streaming module 210 may buffer the received content 140 in the buffer 206 before playback in 418, to synchronize audio and video playback or perform audio/video decoding, for example.

In 418, the media device 106 may transmit the content 140 to the screen 116 in the electronic device 112 (via network 122, for example) for playback to the user 152B. In some embodiments, the media device 106 may also or alternatively transmit the content 140 to the display device 104 (via a HDMI connection 107, for example) for playback; this may occur if the user 152B is located in the media system 150 and is using the electronic device 112 as a remote control for the media device 106.

In 420, if the content is OTA content 110, then the media device 106 may receive wireless signals (RF and/or intermediate frequency signals, for example) containing OTA content 110 from the antenna 108.

In 422, the OTA content tuner 212 may, in a well known manner, decode and/or otherwise process the received signals to extract the OTA content 110 therefrom. The OTA content tuner 212 may only extract from the received signals the OTA content 110 that was requested by the user 152B in 410.

In 424, the OTA app interface 214 in the media device 106 may transmitted the extracted OTA content 110 to the OTA app 114 in the electronic device 112 via the network 122. Then, the OTA app 114 may play the received OTA content 110 on the screen 116 for display to the user 152B. In some embodiments, the OTA app 114 may store the received OTA content 110 in storage 115 for later, on-demand viewing by the user 152B. Embodiments for such deferred, on-demand viewing, for example with regard to AVOD content that is downloaded to electronic devices 112, are described in U.S. patent application Ser. No. 16/430,990, titled "Downloadable AVOD Content," filed herewith, which is herein incorporated by reference in its entirety, and these embodiments may be combined with any of the embodiments described herein.

Also in 424, the media device 106 may provide the OTA content 110 to the display device 104 (via HDMI connection 107, for example) for viewing by a user 152 who is using the media system 150; this may occur if the user 152B is located in the media system 150 and is using the electronic device 112 as a remote control for the media device 106.

In this manner, and further to that described above, this disclosure enables OTA content 110 to be made available to display devices 104 and electronic devices 112 that are either geographically local (that is, proximate) or distant from the antenna 108 and tuner 212 that were used to receive and extract the OTA content 110 from wireless electronic signals.

Example Computer System

Figure 5:
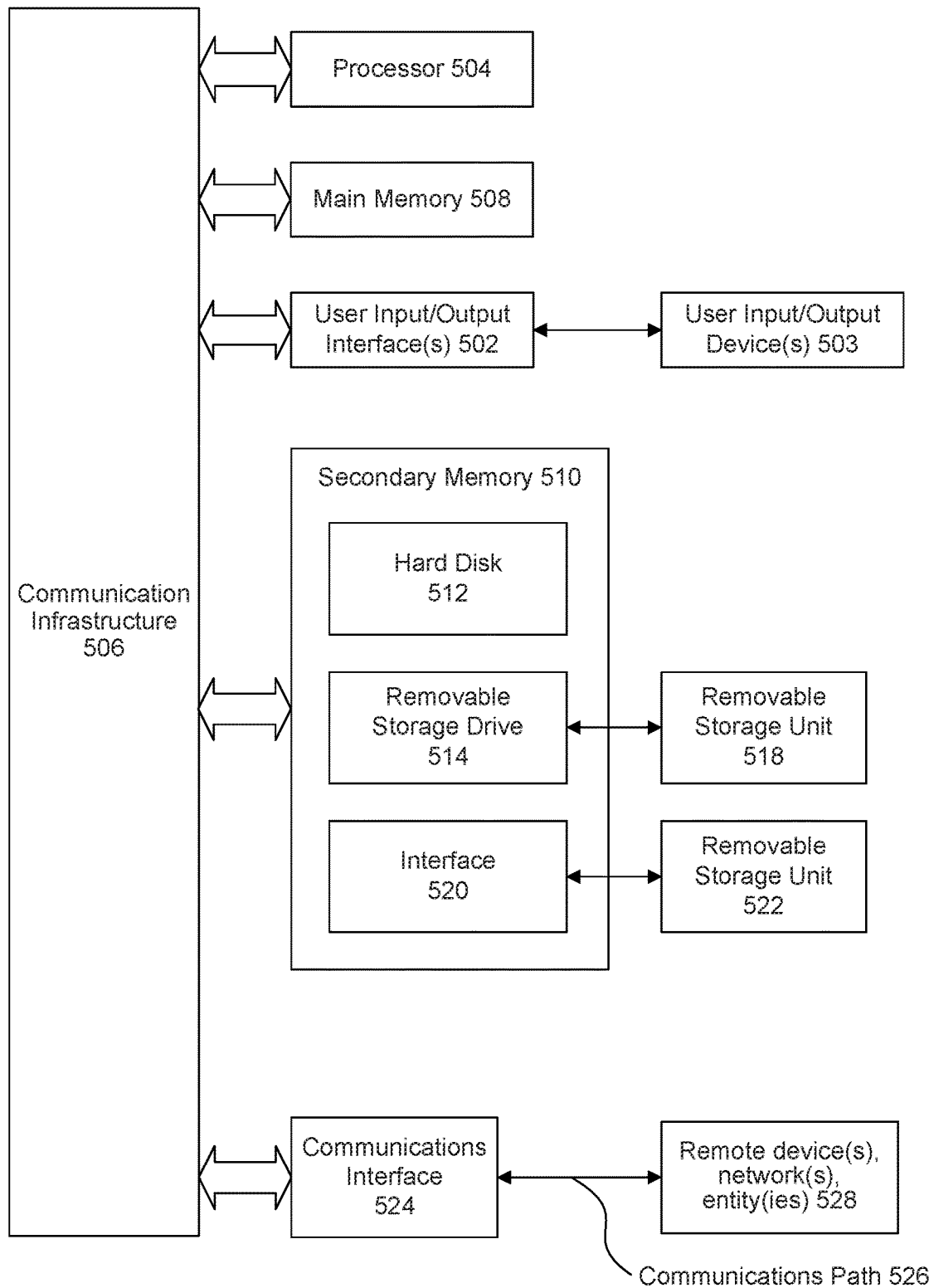
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, one or more computer systems 500 or portions thereof can be used to implement any embodiments of FIGS. 1-4, and/or any combination or sub-combination thereof.

Computer system 500 includes one or more processors (also called central processing units, or CPUs), such as a processor 504. Processor 504 is connected to a communication infrastructure or bus 506.

One or more processors 504 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 can include other means, instrumentalities or other approaches for allowing computer programs and/or other instructions and/or data to be accessed by computer system 500. Such means, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for providing over-the-air (OTA) content from a media system to electronic devices, comprising:
    automatically providing program listings of the OTA content to the electronic devices, wherein the program listings of the OTA content are displayed in user interfaces of the electronic devices, and wherein the OTA content is modulated and upconverted in electronic signals that are wirelessly broadcast by a first system external to the media system, and non-OTA content is streamed over the Internet by a second system external to the media system;
    receiving a user selection of particular OTA content from one of the electronic devices from the program listings of the OTA content, wherein the user selection includes an indication that the particular OTA content is OTA content;
    receiving the electronic signals containing the OTA content broadcast by the first system external to the media system using an antenna, in response to receiving the user selection of the particular OTA content;
    processing, using a tuner, the received electronic signals to extract the particular OTA content therefrom;
    transmitting the extracted OTA content to said one of the electronic devices for playback on a screen of said one of the electronic devices;
    receiving a second user selection of particular non-OTA content from said one of the electronic devices;
    determining whether to synchronize audio and video of the non-OTA content in a buffer of the media system based on whether the second user selection indicates that the non-OTA content is for future on-demand viewing;
    in response to determining that the second user selection indicates that the non-OTA content is for immediate viewing, storing the non-OTA content in the buffer to synchronize the audio and video; and
    transmitting the synchronized audio and video of the non-OTA content to said one of the electronic devices.

2. The method of claim 1, further comprising:
    automatically providing program listings of the non-OTA content to the electronic devices, wherein the program listings of the OTA content and the program listings of the non-OTA content are displayed in the user interfaces of the electronic devices.

3. The method of claim 1, wherein the extracted OTA content is stored in storage of said one of the electronic devices for future on-demand playback to a user.

4. The method of claim 1, wherein the particular OTA content is downloadable advertising-based video on demand (AVOD) content.

5. The method of claim 1, wherein said one of the electronic devices is geographically distant from the antenna and the tuner.

6. The method of claim 1, further comprising:
    transmitting the extracted OTA content to a display device that is geographically proximate to the antenna and the tuner, wherein said one of the electronic devices is being used as a remote control.

7. A non-transitory computer-readable medium having instructions stored thereon that, when executed by at least one computing device, perform operations for providing over-the-air (OTA) content to electronic devices, the operations comprising:
    automatically providing program listings of the OTA content to the electronic devices, wherein the program listings of the OTA content are displayed in user interfaces of the electronic devices, and wherein the OTA content is modulated and upconverted in electronic signals that are wirelessly broadcast by a first system external to a media system, and non-OTA content is streamed over the Internet by a second system external to the media system;
    receiving a user selection of particular OTA content from one of the electronic devices from the program listings of the OTA content, wherein the user selection includes an indication that the particular OTA content is OTA content;
    receiving the electronic signals containing the OTA content broadcast by the first system external to the media system using an antenna, in response to receiving the user selection of the particular OTA content;
    processing, using a tuner, the received electronic signals to extract the particular OTA content therefrom; and
    transmitting the extracted OTA content to said one of the electronic devices for playback on a screen of said one of the electronic devices,
    receiving a second user selection of particular non-OTA content from said one of the electronic devices;
    determining whether to synchronize audio and video of the non-OTA content in a buffer of the media system based on whether the second user selection indicates that the non-OTA content is for future on-demand viewing;
    in response to determining that the second user selection indicates that the non-OTA content is for immediate viewing, storing the non-OTA content in the buffer to synchronize the audio and video; and
    transmitting the synchronized audio and video of the non-OTA content to said one of the electronic devices.

8. The non-transitory computer-readable medium of claim 7, the operations further comprising:
    automatically providing program listings of the non-OTA content to the electronic devices, wherein the program listings of the OTA content and the program listings of the non-OTA content are displayed in the user interfaces of the electronic devices.

9. The non-transitory computer-readable medium of claim 7, wherein the extracted OTA content is stored in storage of said one of the electronic devices for future on-demand playback to a user.

10. The non-transitory computer-readable medium of claim 7, wherein the particular OTA content is downloadable advertising-based video on demand (AVOD) content.

11. The non-transitory computer-readable medium of claim 7, wherein said one of the electronic devices is geographically distant from the antenna and the tuner.

12. The non-transitory computer-readable medium of claim 7, the operations further comprising:
transmitting the extracted OTA content to a display device that is geographically proximate to the antenna and the tuner, wherein said one of the electronic devices is being used as a remote control.

13. A media device for providing over-the-air (OTA) content to electronic devices, comprising:
a memory; and
at least one processor coupled to the memory and configured to:
automatically provide program listings of the OTA content to the electronic devices, wherein the program listings of the OTA content are displayed in user interfaces of the electronic devices, and wherein the OTA content is modulated and upconverted in electronic signals that are wirelessly broadcast by a first system external to the media device, and non-OTA content is streamed over the Internet by a second system external to the media device;
receive a user selection of particular OTA content from one of the electronic devices from the program listings of the OTA content, wherein the user selection includes an indication that the particular OTA content is OTA content;
receive the electronic signals containing the OTA content broadcast by the first system external to the media device using an antenna, in response to receiving the user selection of the particular OTA content;
process, using a tuner, the received electronic signals to extract the particular OTA content therefrom; and
transmit the extracted OTA content to said one of the electronic devices for playback on a screen of said one of the electronic devices;
receive a second user selection of particular non-OTA content from said one of the electronic devices;
determine whether to synchronize audio and video of the non-OTA content in a buffer of the media device based on whether the second user selection indicates that the non-OTA content is for future on-demand viewing;
in response to determining that the second user selection indicates that the non-OTA content is for immediate viewing, store the non-OTA content in the buffer to synchronize the audio and video; and
transmit the synchronized audio and video of the non-OTA content to said one of the electronic devices.

14. The media device of claim 13, the at least one processor further configured to:
automatically provide program listings of the non-OTA content to the electronic devices, wherein the program listings of the OTA content and the program listings of the non-OTA content are displayed in the user interfaces of the electronic devices;
receive a user selection of particular non-OTA content from said one of the electronic devices;
download the particular non-OTA content from a content source accessible via the Internet; and
transmit the downloaded non-OTA content to said one of the electronic devices for playback on the screen of said one of the electronic devices.

15. The media device of claim 13, wherein the extracted OTA content is stored in storage of said one of the electronic devices for future on-demand playback to a user.

16. The media device of claim 13, wherein said one of the electronic devices is geographically distant from the antenna and the tuner.

17. The media device of claim 13, the at least one processor further configured to:
transmit the extracted OTA content to a display device that is geographically proximate to the antenna and the tuner, wherein said one of the electronic devices is being used as a remote control.

18. An electronic device that receives over-the-air (OTA) content, comprising:
a memory;
a screen;
at least one processor coupled to the memory and the screen; and
an app configured to, using the at least one processor:
receive program listings of the OTA content, wherein the OTA content is modulated and upconverted in electronic signals that are wirelessly broadcast by a first system external to a media system, and non-OTA content is streamed over the Internet by a second system external to the media system;
display the program listings of the OTA content in a user interface on the screen;
receive a user selection of particular OTA content through user navigation of the user interface;
provide the user selection to the media system, wherein the media system, using a tuner, processes electronic signals received by an antenna to extract the particular OTA content broadcast from the first system external to the media system therefrom, wherein the user selection includes an indication that the particular OTA content is OTA content;
receive the extracted OTA content from the media system via the Internet;
store the received OTA content in storage for future on-demand storage based on the user selection;
play the received OTA content on the screen; and
transmit a second user selection of particular non-OTA content from said one of the electronic devices,
wherein the media system determines whether to synchronize audio and video of the non-OTA content in a buffer of the media system based on whether the second user selection indicates that the non-OTA content is for future on-demand viewing, wherein in response to determining that the second user selection indicates that the non-OTA content is for immediate viewing, the media system buffers the non-OTA content to synchronize the audio and video, and transmits the synchronized audio and video of the non-OTA content to the electronic device.

19. The electronic device of claim 18, wherein the electronic device is one of a computer, smart phone, tablet, wearable, appliance, or internet-of-things (IoT) device.

20. The method of claim 1, wherein the OTA content and the non-OTA content are displayed in different sections of a graphical user interface of the user interfaces of the electronic devices.

21. The method of claim 1, wherein the second system external to the media system is configured to store metadata associated with the non-OTA content and the metadata indicates the non-OTA content available to be streamed to the media system.

22. The non-transitory computer-readable medium of claim 7, wherein the OTA content and the non-OTA content are displayed in different sections of a graphical user interface of the user interfaces of the electronic devices.

23. The non-transitory computer-readable medium of claim 7, wherein the second system external to the media system is configured to store metadata associated with the non-OTA content and the metadata indicates the non-OTA content available to be streamed to the media system.

24. The media device of claim 13, wherein the OTA content and the non-OTA content are displayed in different sections of a graphical user interface of the user interfaces of the electronic devices.

25. The media device of claim 13, wherein the second system external to the media system is configured to store metadata associated with the non-OTA content and the metadata indicates the non-OTA content available to be streamed to the media device.

26. The electronic device of claim 18, wherein the OTA content and the non-OTA content are displayed in different sections of a graphical user interface of the user interface.

27. The electronic device of claim 18, wherein the second system external to the media system is configured to store metadata associated with the non-OTA content and the metadata indicates the non-OTA content available to be streamed to the media system.

\* \* \* \* \*